(12) United States Patent
Walker et al.

(10) Patent No.: US 7,325,078 B2
(45) Date of Patent: Jan. 29, 2008

(54) SECURE DATA SCRUBBING

(75) Inventors: Philip M. Walker, Fort Collins, CO (US); Brian J. O Keefe, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 334 days.

(21) Appl. No.: 11/244,763

(22) Filed: Oct. 6, 2005

(65) Prior Publication Data

US 2007/0083626 A1   Apr. 12, 2007

(51) Int. Cl.
*G06F 3/00* (2006.01)
*G06F 11/00* (2006.01)

(52) U.S. Cl. ............... 710/7; 714/48; 714/718; 714/763

(58) Field of Classification Search ............ 710/7, 710/20; 711/114; 714/5–6, 48–52, 718–723, 714/763–771
See application file for complete search history.

(56) References Cited

U.S. PATENT DOCUMENTS

| | | | |
|---|---|---|---|
| 4,964,130 A * | 10/1990 | Bowden et al. ............. 714/764 |
| 5,923,876 A | 7/1999 | Teague | |
| 6,161,192 A | 12/2000 | Lubbers | |
| 6,170,063 B1 | 1/2001 | Golding | |
| 6,292,869 B1 * | 9/2001 | Gerchman et al. .......... 711/106 |
| 6,295,578 B1 | 9/2001 | Dimitroff | |
| 6,397,293 B2 | 5/2002 | Shrader | |
| 6,487,636 B1 | 11/2002 | Dolphin | |
| 6,490,122 B1 | 12/2002 | Holmquist | |
| 6,493,656 B1 | 12/2002 | Houston | |
| 6,505,268 B1 | 1/2003 | Schultz | |
| 6,523,749 B2 | 2/2003 | Reasoner | |
| 6,546,459 B2 | 4/2003 | Rust | |
| 6,560,673 B2 | 5/2003 | Elliot | |
| 6,587,962 B1 | 7/2003 | Hepner | |
| 6,594,745 B2 | 7/2003 | Grover | |
| 6,601,187 B1 | 7/2003 | Sicola | |
| 6,606,690 B2 | 8/2003 | Padovano | |
| 6,609,145 B1 | 8/2003 | Thompson | |
| 6,629,108 B2 | 9/2003 | Frey | |
| 6,629,273 B1 | 9/2003 | Patterson | |
| 6,643,795 B1 | 11/2003 | Sicola | |
| 6,647,514 B1 | 11/2003 | Umberger | |
| 6,658,590 B1 | 12/2003 | Sicola | |
| 6,663,003 B2 | 12/2003 | Johnson | |
| 6,681,308 B1 | 1/2004 | Dallmann | |
| 6,708,285 B2 | 3/2004 | Oldfield | |
| 6,715,101 B2 | 3/2004 | Oldfield | |
| 6,718,404 B2 | 4/2004 | Reuter | |
| 6,718,434 B2 | 4/2004 | Veitch | |
| 6,721,902 B1 | 4/2004 | Cochran | |
| 6,725,393 B1 | 4/2004 | Pellegrino | |
| 6,742,020 B1 | 5/2004 | Dimitroff | |
| 6,745,207 B2 | 6/2004 | Reuter | |
| 6,763,409 B1 | 7/2004 | Elliot | |
| 6,772,231 B2 | 8/2004 | Reuter | |
| 6,775,790 B2 | 8/2004 | Reuter | |
| 6,795,904 B1 | 9/2004 | Kamvysselis | |

(Continued)

*Primary Examiner*—Christopher Shin

(57) ABSTRACT

In one embodiment, a method comprises receiving, at a processor, an input/output request that designates at least one data block on a storage medium against which the input/output operation is to be executed; and altering a response to the input/output request when a scrub state data table indicates that the at least one data block designated in the input/output request is subject to an open scrub command.

22 Claims, 8 Drawing Sheets

U.S. PATENT DOCUMENTS

| | | |
|---|---|---|
| 6,802,023 B2 | 10/2004 | Oldfield |
| 6,807,605 B2 | 10/2004 | Umberger |
| 6,817,522 B2 | 11/2004 | Brignone |
| 6,832,340 B2 | 12/2004 | Larson |
| 6,839,824 B2 | 1/2005 | Camble |
| 6,845,472 B2 | 1/2005 | Walker |
| 6,848,063 B2 | 1/2005 | Rodeheffer |
| 6,976,204 B1 * | 12/2005 | Chambers et al. .......... 714/763 |
| 7,017,107 B2 * | 3/2006 | Talagala et al. ............ 714/819 |
| 2002/0019863 A1 | 2/2002 | Reuter |
| 2002/0019908 A1 | 2/2002 | Reuter |
| 2002/0019920 A1 | 2/2002 | Reuter |
| 2002/0019922 A1 | 2/2002 | Reuter |
| 2002/0019923 A1 | 2/2002 | Reuter |
| 2002/0048284 A1 | 4/2002 | Moulton |
| 2002/0162075 A1 * | 10/2002 | Talagala et al. ............ 714/819 |
| 2002/0188800 A1 | 12/2002 | Tomaszewski |
| 2003/0056038 A1 | 3/2003 | Cochran |
| 2003/0063134 A1 | 4/2003 | Lord |
| 2003/0074492 A1 | 4/2003 | Cochran |
| 2003/0079014 A1 | 4/2003 | Lubbers |
| 2003/0079074 A1 | 4/2003 | Sicola |
| 2003/0079082 A1 | 4/2003 | Sicola |
| 2003/0079083 A1 | 4/2003 | Lubbers |
| 2003/0079102 A1 | 4/2003 | Lubbers |
| 2003/0079156 A1 | 4/2003 | Sicola |
| 2003/0084241 A1 | 5/2003 | Lubbers |
| 2003/0101318 A1 | 5/2003 | Kaga |
| 2003/0110237 A1 | 6/2003 | Kitamura |
| 2003/0126315 A1 | 7/2003 | Tan |
| 2003/0126347 A1 | 7/2003 | Tan |
| 2003/0140191 A1 | 7/2003 | McGowen |
| 2003/0145045 A1 | 7/2003 | Pellegrino |
| 2003/0145130 A1 | 7/2003 | Schultz |
| 2003/0170012 A1 | 9/2003 | Cochran |
| 2003/0177323 A1 | 9/2003 | Popp |
| 2003/0187847 A1 | 10/2003 | Lubbers |
| 2003/0187947 A1 | 10/2003 | Lubbers |
| 2003/0188085 A1 | 10/2003 | Arakawa |
| 2003/0188114 A1 | 10/2003 | Lubbers |
| 2003/0188119 A1 | 10/2003 | Lubbers |
| 2003/0188153 A1 | 10/2003 | Demoff |
| 2003/0188218 A1 | 10/2003 | Lubbers |
| 2003/0188229 A1 | 10/2003 | Lubbers |
| 2003/0188233 A1 | 10/2003 | Lubbers |
| 2003/0191909 A1 | 10/2003 | Asano |
| 2003/0191919 A1 | 10/2003 | Sato |
| 2003/0196023 A1 | 10/2003 | Dickson |
| 2003/0212781 A1 | 11/2003 | Kaneda |
| 2003/0229651 A1 | 12/2003 | Mizuno |
| 2003/0236953 A1 | 12/2003 | Grieff |
| 2004/0019740 A1 | 1/2004 | Nakayama |
| 2004/0022546 A1 | 2/2004 | Cochran |
| 2004/0024838 A1 | 2/2004 | Cochran |
| 2004/0024961 A1 | 2/2004 | Cochran |
| 2004/0030727 A1 | 2/2004 | Armangau |
| 2004/0030846 A1 | 2/2004 | Armangau |
| 2004/0049634 A1 | 3/2004 | Cochran |
| 2004/0078638 A1 | 4/2004 | Cochran |
| 2004/0078641 A1 | 4/2004 | Fleischmann |
| 2004/0128404 A1 | 7/2004 | Cochran |
| 2004/0168034 A1 | 8/2004 | Sigeo |
| 2004/0215602 A1 | 10/2004 | Cioccarelli |
| 2004/0230859 A1 | 11/2004 | Cochran |
| 2004/0267959 A1 | 12/2004 | Cochran |
| 2005/0028045 A1 * | 2/2005 | Kawaike ..................... 714/47 |
| 2005/0028048 A1 | 2/2005 | New |
| 2005/0273646 A1 * | 12/2005 | Hillier et al. .................. 714/5 |

* cited by examiner

SECURE DATA SCRUBBING

BACKGROUND

The described subject matter relates to electronic computing storage media, and more particularly to secure data scrubbing.

Effective collection, management, and control of information have become a central component of modern business processes. To this end, many businesses, both large and small, now implement computer-based information management systems.

Data management is an important component of computer-based information management systems. Many users implement storage networks to manage data operations in computer-based information management systems. Storage networks have evolved in computing power and complexity to provide highly reliable, managed storage solutions that may be distributed across a wide geographic area.

In some instances, storage capacity provided by storage networks and network attached storage devices functions as a resource shared between multiple users. Many storage networks and devices employ storage virtualization schemes which have insulated storage network users and administrators from many of the administrative aspects of managing physical storage. Nevertheless, virtualized storage schemes ultimately map to physical storage space, raising the possibility that unscrupulous users of the storage system may attempt illicitly to access data on the physical storage media of the storage network and/or devices.

SUMMARY

In one embodiment, a method comprises receiving, at a processor, an input/output request that designates at least one data block on a storage medium against which the input/output operation is to be executed; and altering a response to the input/output request when a scrub state data table indicates that the at least one data block designated in the input/output request is subject to an open scrub command.

BRIEF DESCRIPTION OF THE DRAWINGS

The detailed description is described with reference to the accompanying figures.

DETAILED DESCRIPTION

Described herein are exemplary system and methods for implementing secure data scrubbing in electronic computing storage media. The methods described herein may be embodied as logic instructions on a computer-readable medium. When executed on a processor such as, e.g., an array controller, the logic instructions cause the processor to be programmed as a special-purpose machine that implements the described methods. The processor, when configured by the logic instructions to execute the methods recited herein, constitutes structure for performing the described methods. The methods will be explained with reference to one or more volumes in a storage system, but the methods need not be limited to volumes. The methods are equally applicable to personal computer hard drives, optical storage media, magneto-optical media, and tape media.

Figure 1:
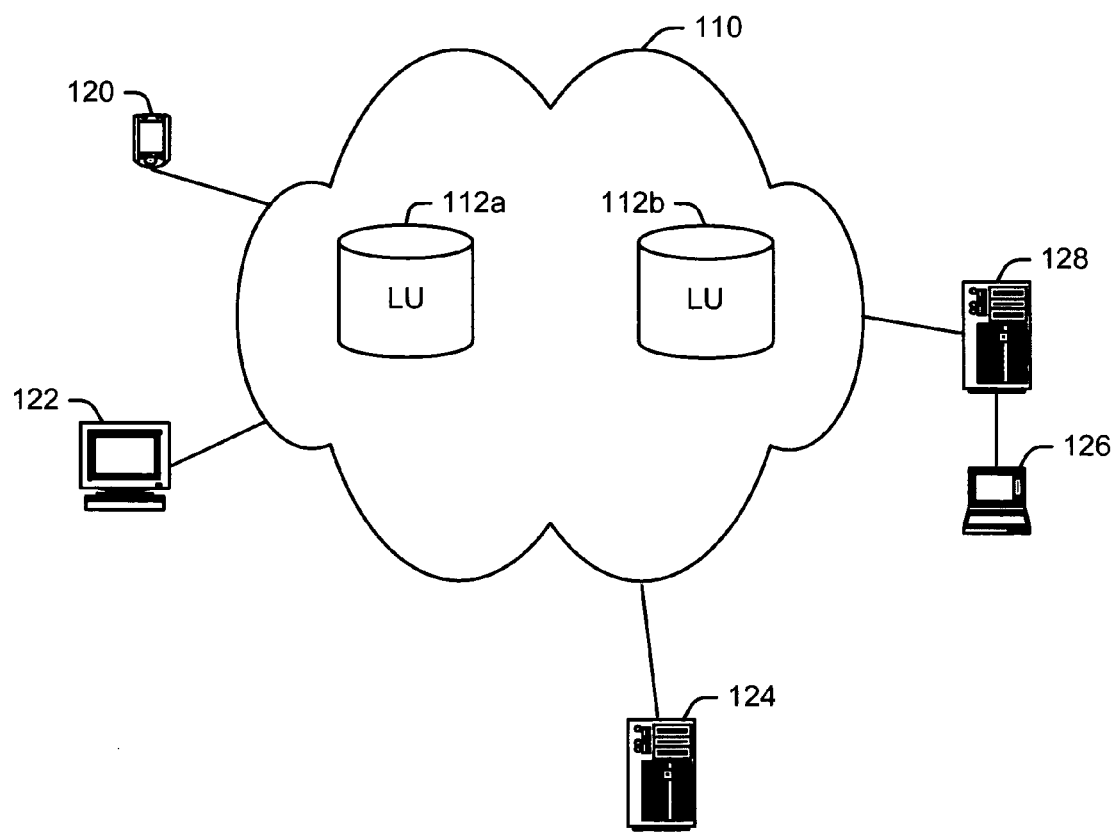
FIG. 1 is a schematic illustration of an exemplary embodiment of a networked computing system that utilizes a storage network.

FIG. 1 is a schematic illustration of an exemplary embodiment of a networked computing system 100 that utilizes a storage network. The storage network comprises a storage pool 110, which comprises an arbitrarily large quantity of storage space. In practice, a storage pool 110 has a finite size limit determined by the particular hardware used to implement the storage pool 110. However, there are few theoretical limits to the storage space available in a storage pool 110.

A plurality of logical disks (also called logical units or LUs) 112a, 112b may be allocated within storage pool 110. Each LU 112a, 112b comprises a contiguous range of logical addresses that can be addressed by host devices 120, 122, 124 and 128 by mapping requests from the connection protocol used by the host device to the uniquely identified LU 112. As used herein, the term "host" comprises a computing system(s) that utilize storage on its own behalf, or on behalf of systems coupled to the host. For example, a host may be a supercomputer processing large databases or a transaction processing server maintaining transaction records. Alternatively, a host may be a file server on a local area network (LAN) or wide area network (WAN) that provides storage services for an enterprise. A file server may comprise one or more disk controllers and/or RAID controllers configured to manage multiple disk drives. A host connects to a storage network via a communication connection such as, e.g., a Fibre Channel (FC) connection.

A host such as server 128 may provide services to other computing or data processing systems or devices. For example, client computer 126 may access storage pool 110 via a host such as server 128. Server 128 may provide file services to client 126, and may provide other services such as transaction processing services, email services, etc. Hence, client device 126 may or may not directly use the storage consumed by host 128.

Devices such as wireless device 120, and computers 122, 124, which are also hosts, may logically couple directly to LUs 112a, 112b. Hosts 120-128 may couple to multiple LUs 112a, 112b, and LUs 112a, 112b may be shared among multiple hosts. Each of the devices shown in FIG. 1 may include memory, mass storage, and a degree of data processing capability sufficient to manage a network connection.

Figure 2:
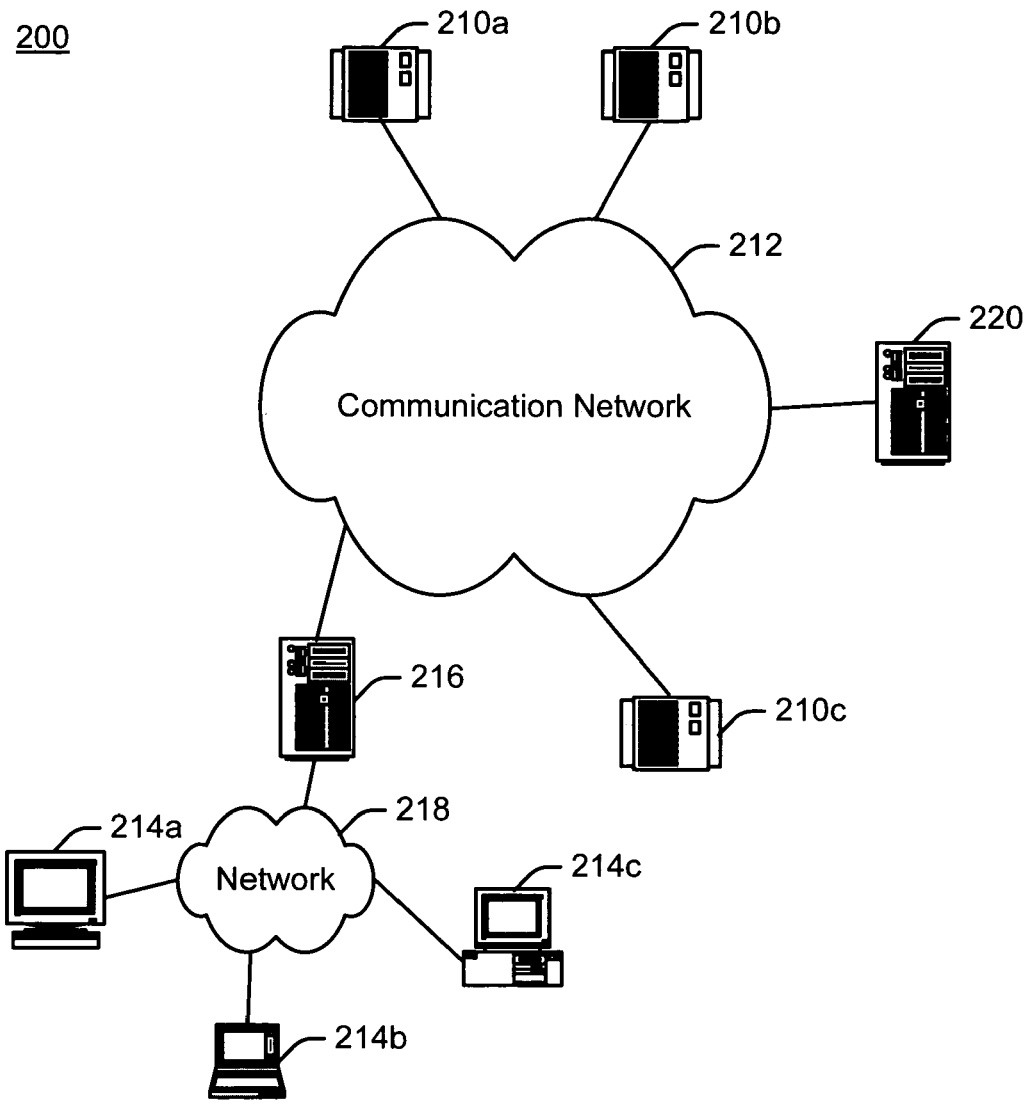
FIG. 2 is a schematic illustration of an exemplary embodiment of a storage network.

FIG. 2 is a schematic illustration of an exemplary storage network 200 that may be used to implement a storage pool such as storage pool 110. Storage network 200 comprises a plurality of storage cells 210a, 210b, 210c connected by a communication network 212. Storage cells 210a, 210b, 210c may be implemented as one or more communicatively connected storage devices. Exemplary storage devices include the STORAGEWORKS line of storage devices commercially available from Hewlett-Packard Corporation of Palo Alto, Calif., USA. Communication network 212 may be implemented as a private, dedicated network such as, e.g., a Fibre Channel (FC) switching fabric. Alternatively, portions of communication network 212 may be implemented using public communication networks pursuant to a suitable communication protocol such as, e.g., the Internet Small Computer Serial Interface (iSCSI) protocol.

Client computers 214a, 214b, 214c may access storage cells 210a, 210b, 210c through a host, such as servers 216, 220. Clients 214a, 214b, 214c may be connected to file server 216 directly, or via a network 218 such as a Local Area Network (LAN) or a Wide Area Network (WAN). The number of storage cells 210a, 210b, 210c that can be included in any storage network is limited primarily by the connectivity implemented in the communication network 212. A switching fabric comprising a single FC switch can interconnect 256 or more ports, providing a possibility of hundreds of storage cells 210a, 210b, 210c in a single storage network.

Figure 3:
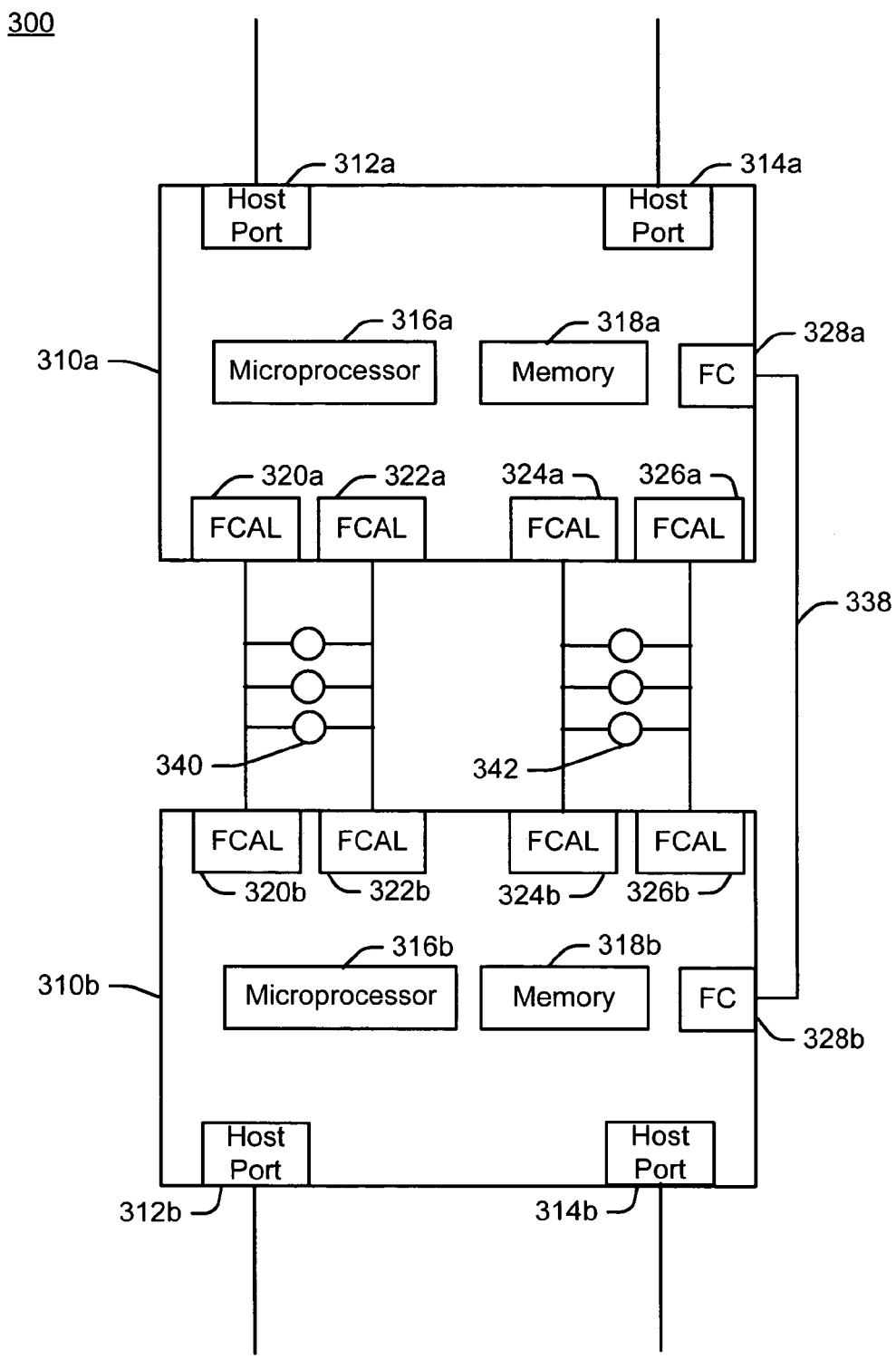
FIG. 3 is a schematic illustration of an exemplary embodiment of an array controller.

FIG. 3 is a schematic illustration of an exemplary embodiment of a storage cell 300. It will be appreciated that the storage cell 300 depicted in FIG. 3 is merely one exemplary embodiment, which is provided for purposes of explanation. The particular details of the storage cell 300 are not critical. Referring to FIG. 3, storage cell 300 includes redundant storage controllers, also referred to as disk array controllers or array controllers, 310a, 310b to manage the operations and the transfer of data to and from one or more sets of disk drives 340, 342. Storage controllers 310a, 310b may be implemented as plug-in cards having a microprocessor 316a, 316b, and memory 318a, 318b. Each storage controller 310a, 310b includes dual host adapter ports 312a, 314a, 312b, 314b that provide an interface to a host, i.e., through a communication network such as a switching fabric. In a Fibre Channel implementation, host adapter ports 312a, 312b, 314a, 314b may be implemented as FC N_Ports. Each host adapter port 312a, 312b, 314a, 314b manages the login and interface with a switching fabric, and is assigned a fabric-unique port ID in the login process. The architecture illustrated in FIG. 3 provides a fully-redundant storage cell. This redundancy is entirely optional; only a single storage controller is required to implement a storage cell.

Each storage controller 310a, 310b further includes a communication port 328a, 328b that enables a communication connection 338 between the storage controllers 310a, 310b. The communication connection 338 may be implemented as a FC point-to-point connection, or pursuant to any other suitable communication protocol.

In an exemplary implementation, storage controllers 310a, 310b further include a plurality of Fiber Channel Arbitrated Loop (FCAL) ports 320a-326a, 320b-326b that implements an FCAL communication connection with a plurality of storage devices, e.g., sets of disk drives 340, 342. While the illustrated embodiment implement FCAL connections with the sets of disk drives 340, 342, it will be understood that the communication connection with sets of disk drives 340, 342 may be implemented using other communication protocols. For example, rather than an FCAL configuration, a FC switching fabric may be used.

In operation, the storage capacity provided by the sets of disk drives 340, 342 may be added to the storage pool 110. When an application requires storage capacity, logic instructions on a host computer 128 establish a LU from storage capacity available on the sets of disk drives 340, 342 available in one or more storage sites. It will be appreciated that, because a LU is a logical unit, not a physical unit, the physical storage space that constitutes the LU may be distributed across multiple storage cells. Data for the application is stored on one or more LUs in the storage network. An application that needs to access the data queries a host computer, which retrieves the data from the LU and forwards the data to the application.

In some embodiments, storage cell 300 may be configured to implement RAID data redundancy. For example, one or more of the controllers 310a, 310b may be configured to implement RAID redundancy across the disks 340, 342. In other embodiments, the storage cell 300 may be configured as a JBOD (just a bunch of disks).

Further, each disk 340, 342 within the storage cell 300 may include a disk controller that controls the operations of the disk 340, 342. A disk controller controls the low-level operations of the disk. Hence, in operation one or more of the storage controllers 310a, 310b may issue read and/or write instructions to a disk controller, and the disk controller executes the read and/or write operation against the disk media.

Figure 4:
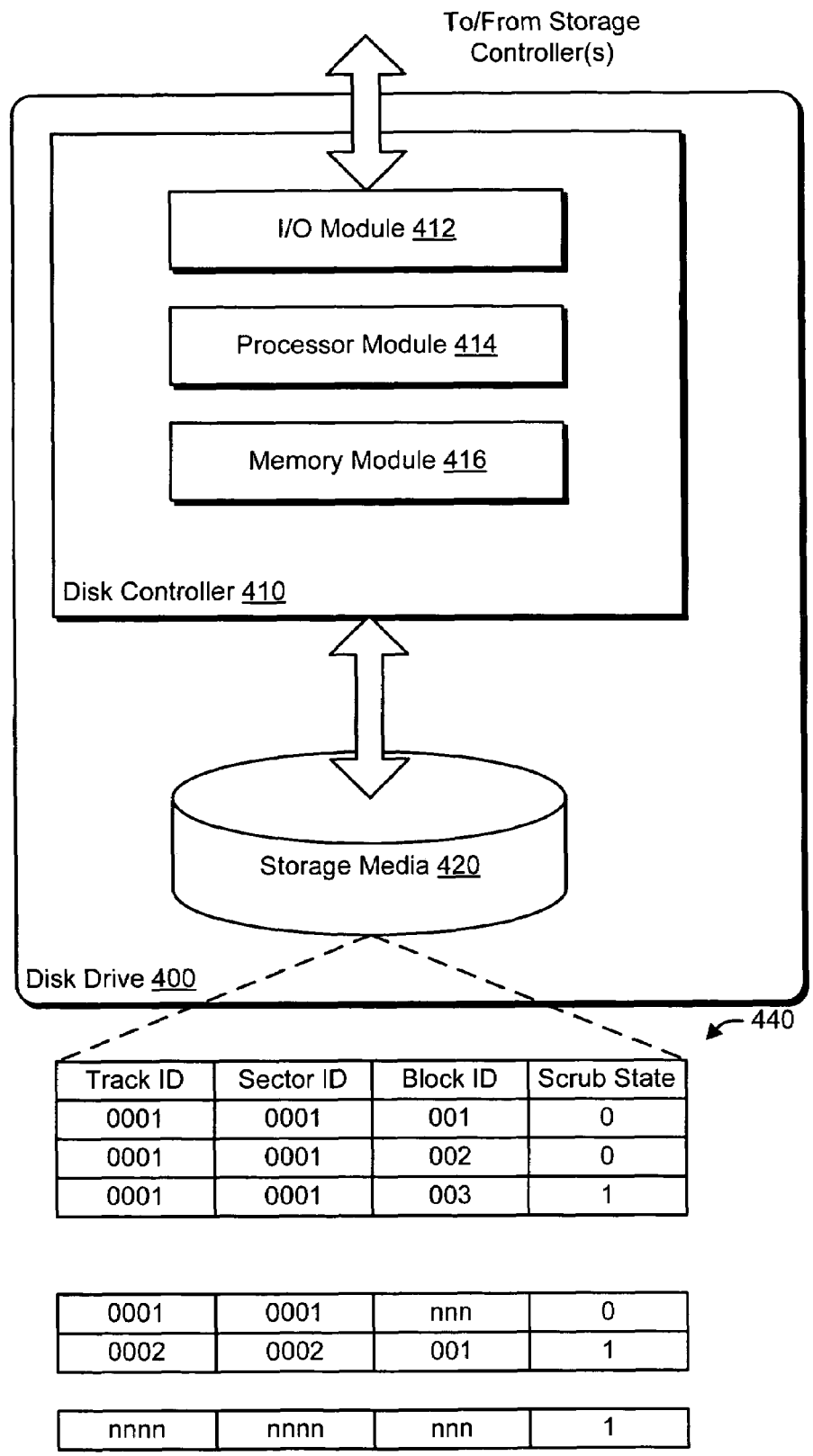
FIG. 4 is a schematic illustration of an exemplary embodiment of a disk drive adapted to manage scrubbing operations.

In some embodiments the disk controller, alone or in cooperation with a storage controllers 310a, 310b, manage scrubbing operations for one or more of the disks 340, 342 in the storage cell 300. FIG. 4 is a schematic illustration of a disk drive 400 adapted to manage scrubbing operations in accordance with an embodiment. For clarity, disk drive components irrelevant to scrubbing operations such as, e.g., the spindle motor, the actuator, etc. are not shown. Referring to FIG. 4, a disk drive 400 comprises a disk controller 410 and a storage media 420. Storage media 420 may be implemented as a hard disk drive, a floppy disk drive, a CD-ROM, a DVD-ROM, a magneto-optical storage media, a tape media, and the like.

The disk controller 410 may be implemented on a suitable logic board (not shown) of the disk drive 400. Disk controller 410 comprises an I/O module 412 that manages I/O operations with an external device such as, e.g., one or more of the storage controllers 310a, 310b. Disk controller 410 further comprises a processor module 414 and a memory module 416.

In some embodiments, operational instructions for the disk controller 410 may be embodied as logic instructions such as, e.g., software or firmware, stored in the memory module 416. The operational instructions may configure the disk controller to generate control signals that control the spindle motor and the actuator so that various areas of the storage media 420 can be accessed. The disk controller 410 may also manage read and write operations to the storage media 420. Disk controller 410 may also be configured to manage an internal cache, pre-fetch data from the storage media 420, and/or implement power management features.

In one embodiment, the memory module 416 of disk controller 410 may include logic instructions which, when executed by the processor module 414, configure the controller 410 to recognize a scrubbing operation command, to execute a data scrubbing operation on a specified range of data from storage media 420. The particular scrubbing routine implemented by the disk controller is not important to the subject matter of this application. Exemplary scrubbing techniques are described in commonly assigned U.S. Pat. Nos. 6,845,472 and 6,848,063, the disclosures of which are incorporated herein by reference in their entirety.

Each addressable unit of storage may be addressed by a logical block address (LBA) or physical block address (PBA), depending on whether the addresses are logically or physically organized. Various storage technologies will map these block addresses to appropriate combinations of sector, track, layer, unit, bus, and so forth, as appropriate. In practice, the smallest atomic writable unit of storage may consist of multiple addressable units of storage. Therefore, when writing to any addressable unit within such a composite writable unit, the entire writable unit must be written to the media. However, a subset of one or more addressable units may be modified in isolation from the remainder of the atomic writable block by reading the entire unit, modifying a subset of it, and then writing the entire unit ("read-modify-write").

Various embodiments may associate scrub state information with each of the smallest writable units, or with each addressable unit, as required to support the needed scrub granularity. However, to transparently duplicate the data erasure functionality of existing scrubbing technology, the scrub granularity will necessarily match the write granularity.

In one embodiment, disk controller 410 is configured to generate and maintain a scrub state data table 440 on the storage media 420, or possibly elsewhere. The scrub state data table 440 stores an indicator of the scrub state of one or more physical storage segments on the storage media. In one embodiment the scrub state data table 440 includes a column that logs the Track ID of each track on the disk, a column that logs the Sector ID of each sector of each track, a column that logs the Block ID of each block in the sector, and a column that includes an indicator of the Scrub State associated with the Block ID. The scrub state data table 440 may be stored and maintained on any location of the storage media 420, or possibly elsewhere.

In some embodiments stored state information may be associated with storage blocks as a physical extension of the data block itself (for example, in a header). In other embodiments state information may be stored in a location that is physically separate from the various data blocks. The techniques described herein are described in a context in which scrub state information may be stored in a separate physical location from most, if not all of the associated data blocks being managed. The potential for performance gains when replacing a block write operation with setting of a scrub flag is based in part on the existence of a scrub table that is separate from the data block. In some embodiments the scrub state table may be cached in high speed memory (e.g., static or dynamic RAM) during typical operation, with periodic flushes of scrub state to non-volatile memory. In some embodiments, the scrub state information may be kept directly in non-volatile memory without a cache layer, if such non-volatile memory is sufficiently fast. These embodiments avoid a potential security exposure resulting from lost scrub state (for example, during a power loss event before scrub state cache has been flushed to non-volatile storage.)

While the embodiment depicted in FIG. 4 illustrates a hard disk drive as an example of a storage media 420, other storage media may be substituted. For example, storage media 420 may be embodied as a magnetic data tape, in which case the scrub state data table 440 may record the scrub state of data blocks on the tape. The scrub state data table 440 may be stored on the data tape or on an auxiliary memory module associated with the data tape such as, for example, the media auxiliary memory (MAM). In alternate embodiments the storage media 420 may be embodied as a CD-ROM, a DVD-ROM, a magneto-optical drive, or any other persistent storage media.

As used herein, the phrase "scrub state" indicates whether the particular block of memory has been the target of a scrub operation. Data scrubbing operations in physical media may be implemented, e.g., in utility computing environments, to clear data areas in memory after one or more applications are closed or user sessions terminated to prevent another party from obtaining usernames, passwords, or other user data.

The response to attempted reads of scrubbed data may be to emulate the behavior of existing storage devices. Hence, storage devices incorporating techniques described herein will be compatible with the expectations incorporated into existing storage management software when reading previously scrubbed data. Existing data scrubbing techniques implement scrubbing by overwriting the block data with various data patterns. Therefore, subsequent reads to a scrubbed block will typically succeed and will return the data pattern that was used to perform the scrub. In some embodiments, it will therefore be useful for reads of scrubbed blocks to succeed, returning the appropriate scrubbed data pattern, as expected by storage management software. To this end, various embodiments can provide one or more methods for application layers to access the new rapid scrub functionality, including both implicitly and explicit methods. One technique is to provide application layer access to a new explicit rapid scrub command (this approach requires application layer software to be modified in order to benefit from the invention). Another technique is to associate one or more predefined data patterns with the scrub function, and translate incoming writes commands to scrub commands, if they provide write data that matches a designated scrub pattern. This approach permits existing storage management software to benefit from the invention without modification, by implicitly performing rapid scrubs in place of some requested actual scrubs. In addition, it provides the potential for performance gains for a larger set of writes beyond those intended only for scrubbing existing data.

There are also potential new applications in which the behavior in response to attempted reads of scrubbed data will fail, notifying the application software that an attempt was made to read data that has not yet been initialized, or does not yet exist. This could be useful in testing storage management software. In applications where reading of scrubbed but not yet re-written sectors is considered a security violation, it could identify security holes or otherwise identify attacks.

Figure 5:
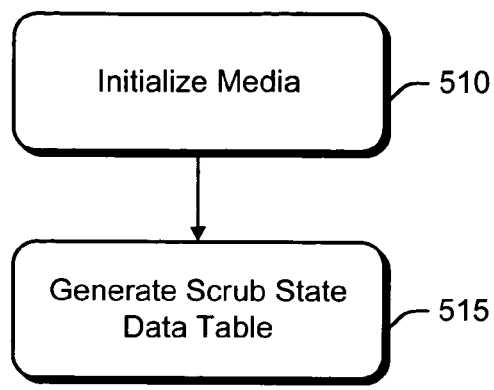
FIG. 5 is a flowchart illustrating operations in a method of initializing a storage medium in accordance with an embodiment.
Figure 6:
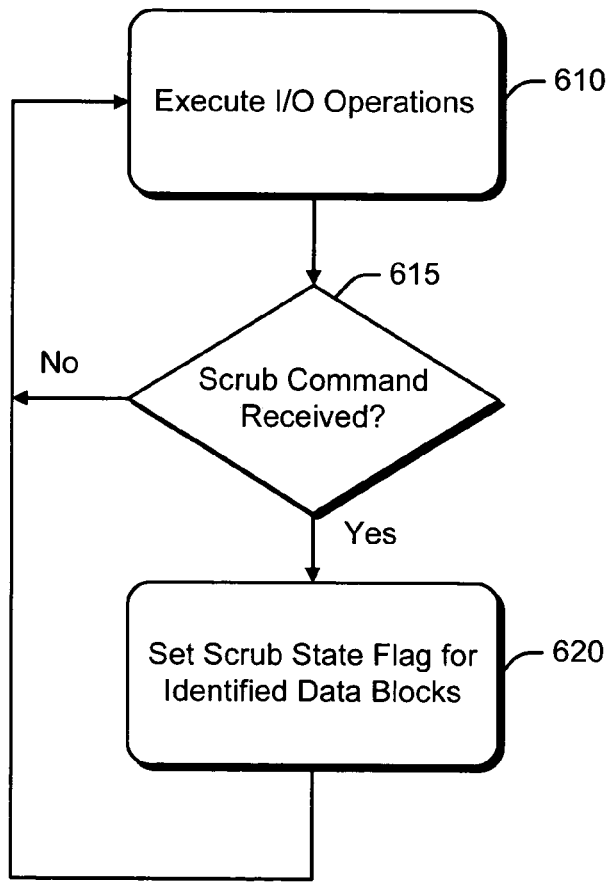
FIG. 6 is a flowchart illustrating operations in one method of managing a scrub state data table in accordance with an embodiment.
Figure 7:
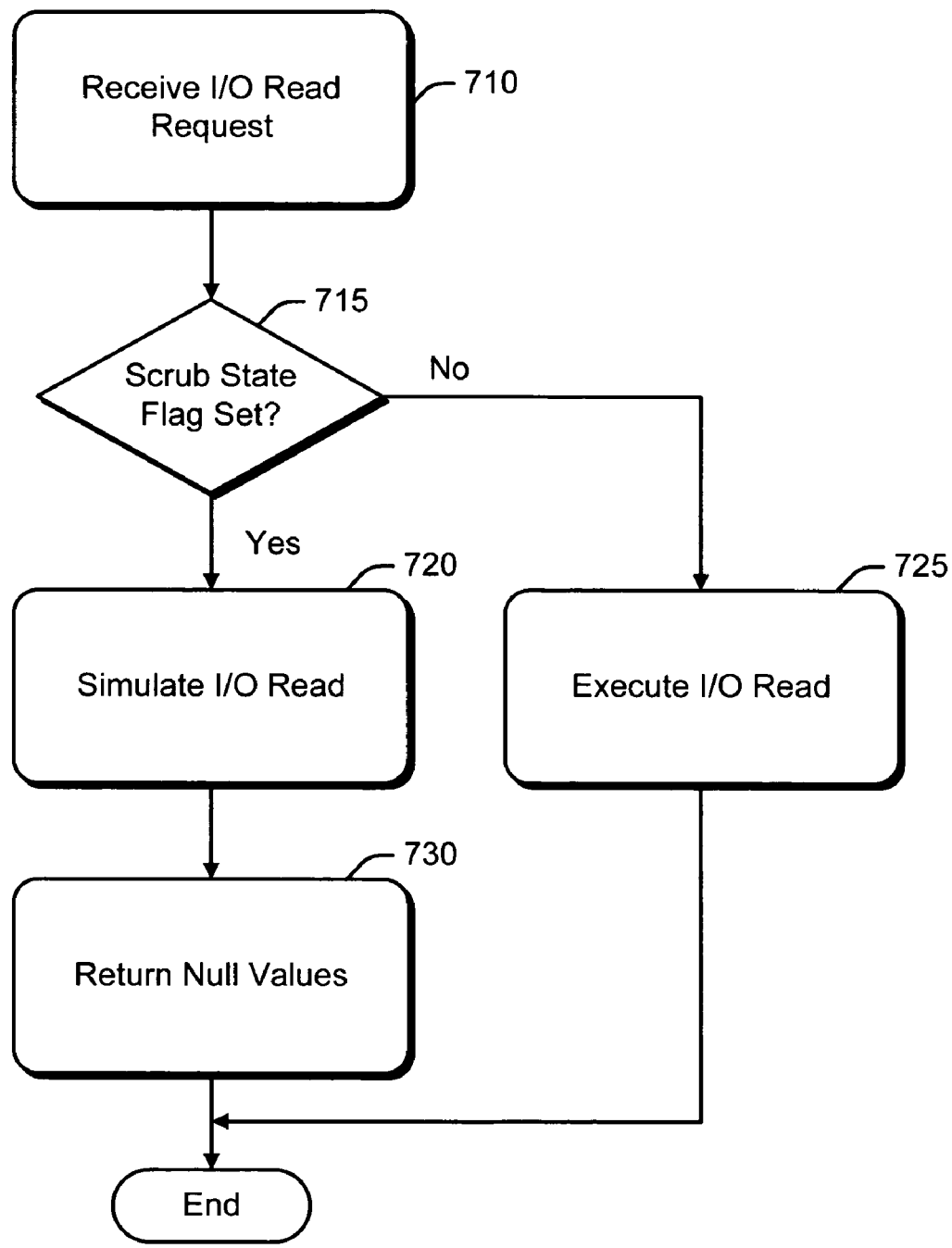
FIG. 7 is a flowchart illustrating operations in one method of executing I/O operations in accordance with an embodiment.

FIGS. 5-7 are flowchart illustrating operations involving managing storage using a scrub state data table. In one embodiment the operations of FIGS. 5-7 may be implemented by a controller such as, e.g., the disk controller 410 of a disk drive. In alternate embodiments the operations of FIGS. 5-7 may be implemented by another processor such as, e.g., a storage controller 310a, 310b.

FIG. 5 is a flowchart illustrating operations in one method of initializing a storage medium in accordance with an embodiment. Referring to FIG. 5, at operation 510 the storage media is initialized. In one embodiment initializing the storage media may comprise operations including formatting the storage media into addressable memory locations and assigning one or more network addresses to the storage media. At operation 515 the scrub state data table is generated. In one embodiment, generating the scrub state data table comprises creating a table having data fields for each track, sector, and block on the storage medium, and a data field to store an indicia of the scrub state for the memory location identified by each track, sector, and block.

The scrub state data fields may be initialized to a value that indicates that the memory location has not been the subject of a scrub operation. In the table depicted in FIG. 4 the scrub state is depicted by the binary values 0 or 1, but any other suitable indicia may be used. The selection of a value (e.g., 0 or 1) to represent positive or negative scrub state is a matter of design choice.

Embodiments that require only two scrub states may track scrub state as a boolean value. In other embodiments, scrub state may be implemented with the capacity to represent more than two states. In one embodiment, three block states exist: NeverWritten, Written, and Scrubbed. In this embodiment, the "NeverWritten" state can be configured to differ from the scrubbed state in one or more ways. For example, reads to a NeverWritten block could be configured to succeed and return a configurable read pattern (for example, all zeros), or to fail with a unique identifiable "NeverWritten" error code. When configured to return this new error condition, it becomes possible for applications to distinguish between Scrubbed blocks and NeverWritten blocks. It is also possible in this embodiment to configure reads to Never-Written blocks to behave the same as reads to Scrubbed blocks, by tracking the original scrub patterns in the scrub state table and returning the appropriate pattern during subsequent reads.

FIG. 6 is a flowchart illustrating operations in one method of managing a scrub state data table in a storage medium in accordance with an embodiment. Referring to FIG. 6, at operation 610 input/output (I/O) operations are executed against the storage medium. If, at operation 615 an I/O operation does not include a scrub command, then control passes back to operation 610 and I/O operations are executed normally.

By contrast, if at operation 615 an I/O operation includes a scrub command, then control passes to operation 620 and the scrub state flag for the data block(s) identified in the scrub command are set to reflect that the data blocks have been the subject of a scrub command.

FIG. 7 is a flowchart illustrating operations in one method of executing I/O operations in accordance with an embodiment. Referring to FIG. 7, at operation 710 an I/O read request is received, e.g., at the disk controller 410. The I/O read request includes a parameter that identifies the data block(s) on the disk to which the I/O request is directed.

At operation 715 the disk controller 410 determines whether the scrub state flag is set for one or more of the data blocks specified in the I/O request. In one embodiment the disk controller accesses the scrub state data table 440 for the track, sector, and block ID that corresponds to the data block(s) identified in the I/O read request and retrieves the scrub state from the scrub state data table 440. If the scrub state flag is not set, then control passes to operation 725 and the I/O read request may be executed pursuant to normal operating procedures.

By contrast, if at operation 715 the scrub state flag is set in one embodiment, control passes to operation 720, the controller simulates a successful I/O request without an actual read I/O operation being performed, and control then passes to operation 730. In an alternate embodiment, the I/O request is canceled and an error condition is generated.

At operation 730 the processor returns simulated scrub data in response to the I/O request. In one embodiment the scrub data may include or be accompanied by an indicator (for example, a status flag or byte) that indicates to the requesting device that the I/O request was simulated rather than being executed against the requested data blocks. In another embodiment the scrub data may consist of a random or meaningless sequence of values (e.g., 0s and/or 1s).

In one embodiment, the disk controller 410 (or storage controller 310a, 310b) may schedule a subsequent operation to perform an actual physical scrub of some or all of the media blocks that were quick-scrubbed but not yet actually scrubbed. In another embodiment, some or all quick-scrubbed blocks are never physically scrubbed (this may provide appropriate and sufficient security in situations where the media is physically secure from intruders). In one embodiment, the scrub state data table 440 may be updated after a successful physical data scrubbing operation, e.g., by clearing or restoring the scrub state flag to the normal state (e.g., to an "unset" value.)

In some embodiments, the scrub state table contains an indicator of which of various scrub data patterns is to be associated with each scrubbed block. This type of scrub state table permits transparent duplication of the behavior of existing storage devices without modifying existing storage management software. When existing software attempts to write a data pattern that is recognized or designated by the invention as have the characteristics of scrub data (or, optionally, any other from among a set of common data patterns), the recognized blocks within the data provided by the write command are optionally converted to quick scrub commands by the invention, and an indicator of the recognized pattern is stored in the scrub table entry for the selected blocks. Later, during reads of these same blocks, data blocks containing the correct data pattern may then be returned to the application layer by means of the reference in the associated scrub table entries. This feature permits a simulated write to the target blocks (in other words, a rapid scrub) to be implicitly substituted in place of an actual media write operation, but without violating the expectations of client layer or other storage management software during subsequent read operations to the quasi-scrubbed blocks.

Figure 8:
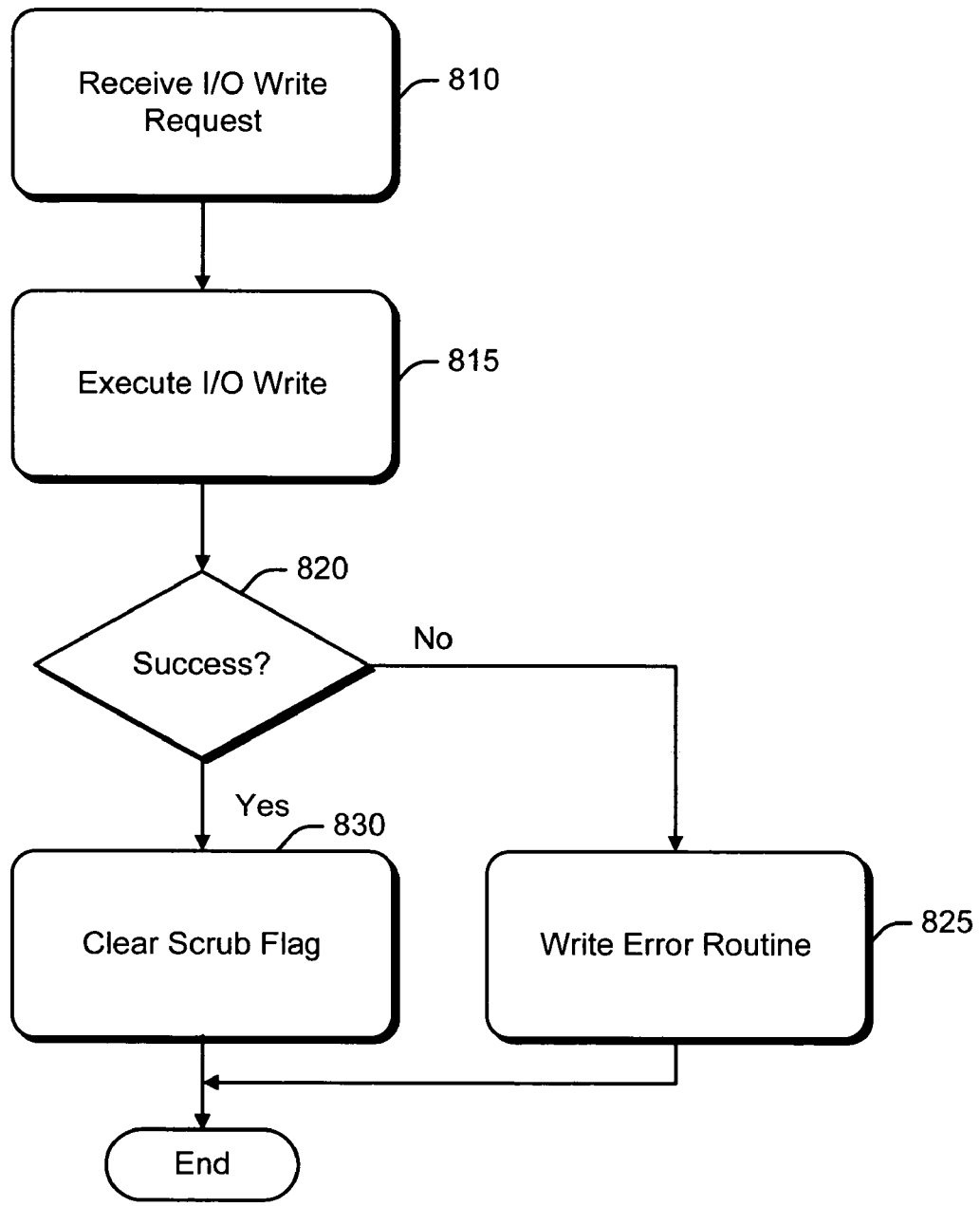
FIG. 8 is a flowchart illustrating operations in one method of managing a scrub state data table in accordance with an embodiment.

FIG. 8 is a flowchart illustrating operations in one method of managing a scrub state data table in accordance with an embodiment. In one embodiment, the scrub state flag associated with a memory location may be updated when a write operation is successfully executed against the memory location. Referring to FIG. 8, at operation 810 an I/O write request is received, e.g., in at the disk controller 410. The I/O write request includes a parameter that identifies the data block(s) on the disk to which the I/O request is directed.

At operation 815 the I/O write request is executed, e.g., by the disk controller 410. If, at operation 820, the I/O write operation is not successful, then control passes to operation 825 and an error routine may be implemented. Example error routines may include one or more of: generating an error signal that indicates a write operation failure, transmitting the error signal from the disk controller to another processor such as, e.g., the storage controllers 310a, 310b, or queuing the write operation for execution at a later time.

By contrast, if at operation 820 the write operation was successful, then control passes to operation 830 and the scrub flag is cleared.

As described briefly above, in alternate embodiments the scrub state data table 440 may be managed by a storage controller 310a, 310b, or by another processor in a network. When the scrub state data table 440 is managed by a storage controller the scrub state data table 440 may be modified to include a storage media identifier that identifies the disk drive (or tape drive, or CD-ROM or other media.

In alternate embodiments, a scrub state data table 440 may be implemented in a data center such as, e.g., a utility computing data center. The various operations described herein may be managed by a suitable computing device such as, e.g., a server computer, which may be in turn utilized to cause a general-purpose or special-purpose processor, or logic circuits programmed with the instructions to perform the operations.

Figure 9:
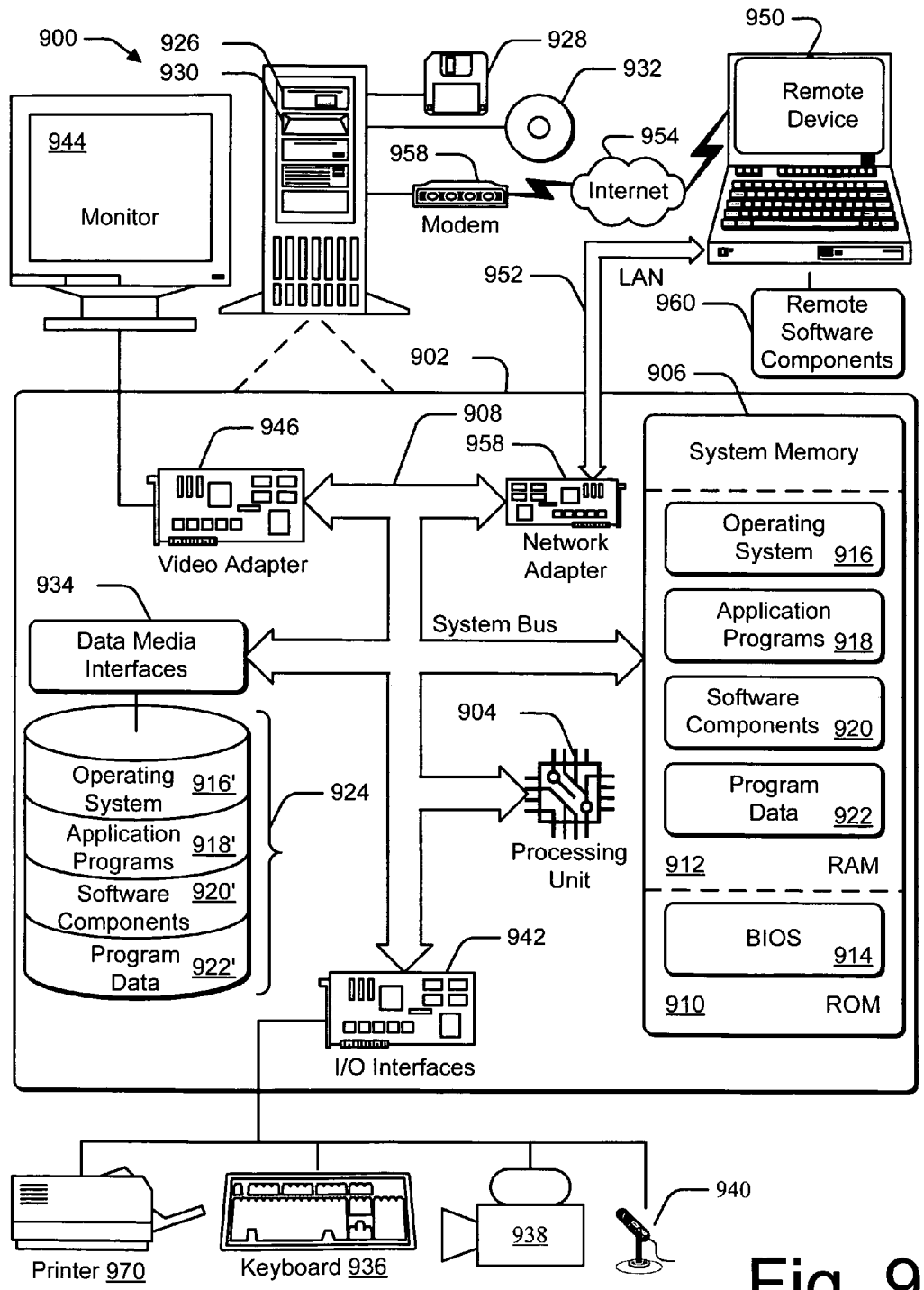
FIG. 9 is a schematic illustration of a computer system.

FIG. 9 is a schematic illustration of a computer system, referred by to reference numeral 900. The components shown in FIG. 9 are only examples, and are not intended to suggest any limitation as to the scope of the functionality of the invention; the invention is not necessarily dependent on the features shown in FIG. 9.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 9, the components of computer 900 may include, but are not limited to, a processing unit 904, a system memory 906, and a system bus 908 that couples various system components including the system memory 906 to the processing unit 904. The system bus 908 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 900 typically includes a variety of computer-readable media. Computer-readable media can be any available media that can be accessed by computer 900 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 900. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 906 includes computer storage media in the form of volatile and/or nonvolatile memory such as read only memory (ROM) 910 and random access memory (RAM) 912. A basic input/output system 914 (BIOS), containing the basic routines that help to transfer information between elements within computer 900, such as during start-up, is typically stored in ROM 910. RAM 912 typically contains data and/or program modules that are immediately accessible to and/or presently being operated on by processing unit 904. By way of example, and not limitation, FIG. 9 illustrates operating system 916, application programs 918, other software components 920, and program data 922.

The computer 900 may also include other removable/non-removable, volatile/nonvolatile computer storage media. By way of example only, the computer system of FIG. 9 may include a hard disk drive 924 that reads from or writes to non-removable, nonvolatile magnetic media, a magnetic disk drive 926 that reads from or writes to a removable, nonvolatile magnetic disk 928, and an optical disk drive 930 that reads from or writes to a removable, nonvolatile optical disk 932 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 924 is typically connected to the system bus 908 through a non-removable memory interface such as data media interface 934, and magnetic disk drive 926 and optical disk drive 930 are typically connected to the system bus 908 by a removable memory interface.

The drives and their associated computer storage media discussed above and illustrated in FIG. 9 provide storage of computer-readable instructions, data structures, program modules, and other data for computer 900. In FIG. 9, for example, hard disk drive 924 is illustrated as storing operating system 916', application programs 918', software components 920', and program data 922'. Note that these components can either be the same as or different from operating system 916, application programs 918, software components 920, and program data 922. Operating system 916, application programs 918, other program modules 920, and program data 922 are given different numbers here to illustrate that, at a minimum, they are different copies. A user may enter commands and information into the computer 900 through input devices such as a keyboard 936 and pointing device 938, commonly referred to as a mouse, trackball, or touch pad. Other input devices (not shown) may include a microphone 940, joystick, game pad, satellite dish, scanner, or the like. These and other input devices are often connected to the processing unit 904 through an input/output (I/O) interface 942 that is coupled to the system bus, but may be connected by other interface and bus structures, such as a parallel port, game port, or a universal serial bus (USB). A monitor 944 or other type of display device is also connected to the system bus 906 via an interface, such as a video adapter 946. In addition to the monitor 944, computers may also include other peripheral output devices (e.g., speakers) and one or more printers 970, which may be connected through the I/O interface 942.

The computer may operate in a networked environment using logical connections to one or more remote computers, such as a remote computing device 950. The remote computing device 950 may be a personal computer, a server, a router, a network PC, a peer device or other common network node, and typically includes many or all of the elements described above relative to computer 900. The logical connections depicted in FIG. 9 include a local area network (LAN) 952 and a wide area network (WAN) 954. Although the WAN 954 shown in FIG. 9 is the Internet, the WAN 954 may also include other networks. Such networking environments are commonplace in offices, enterprise-wide computer networks, intranets, and the like.

When used in a LAN networking environment, the computer 900 is connected to the LAN 952 through a network interface or adapter 956. When used in a WAN networking environment, the computer 900 typically includes a modem 958 or other means for establishing communications over the Internet 954. The modem 958, which may be internal or external, may be connected to the system bus 906 via the I/O interface 942, or other appropriate mechanism. In a networked environment, program modules depicted relative to the computer 900, or portions thereof, may be stored in the remote computing device 950. By way of example, and not limitation, FIG. 9 illustrates remote application programs 960 as residing on remote computing device 950. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
    receiving, at a processor, an input/output request that designates at least one data block on a storage medium against which the input/output operation is to be executed; and
    altering a response to the input/output request when a scrub state data table indicates that the at least one data block designated in the input/output request is subject to an open scrub command.

2. The method of claim 1, wherein altering the response to the input/output request when a scrub state data table indicates that the at least one data block designated in the input/output request is subject to an open scrub command comprises:
    accessing a scrub state data table to determine the data scrub state of the at least one data bock designated in the input/output request.

3. The method of claim 1, wherein altering the response to the input/output request when a scrub state data table indicates that the at least one data block designated in the input/output request is subject to an open scrub command comprises:
    generating an error message that indicates that the I/O request cannot be executed against the at least one data block.

4. The method of claim 1, wherein altering the response to the input/output request when a scrub state data table indicates that the at least one data block designated in the input/output request is subject to an open scrub command comprises:
    returning a meaningless sequence of values in response to the input/output request.

5. The method of claim 1, wherein altering the response to the input/output request when a scrub state data table indicates that the at least one data block designated in the input/output request is subject to an open scrub command comprises:
    returning a pre-existing cached sequence of values in response to the input/output request, wherein the pre-existing cached sequence may be fixed, or may be specified by an entry in the scrub state data table associated with the at least one data block.

6. The method of claim 1, wherein altering the response to the input/output request when a scrub state data table indicates that the at least one data block designated in the input/output request is subject to an open scrub command comprises:
  placing the input/output request in a queue for processing at a later time.

7. The method of claim 1, further comprising executing the input/output request when a scrub state data table indicates that the at least one data block designated in the input/output request is not subject to an open scrub command.

8. The method of claim 1, further comprising:
  executing a write operation to the at least one block on the storage medium; and
  updating the scrub state data table to reflect a successful execution of the scrubbing operation by setting the scrub state to NORMAL.

9. A storage medium controller, comprising:
  an input/output module;
  a processor module; and
  a memory module communicatively connected to the processor and comprising logic instructions which, when executed by the processor, configure the processor to:
  receive, at a processor, an input/output request that designates at least one data block on a storage medium against which the input/output operation is to be executed;
  alter a response to the input/output request when a scrub state data table indicates that the at least one data block designated in the input/output request is subject to an open scrub command.

10. The storage medium controller of claim 9, further comprising logic instructions which, when executed by the processor, configure the processor to:
  access a scrub state data table to determine the data scrub state of the at least one data bock designated in the input/output request.

11. The storage medium controller of claim 9, further comprising logic instructions which, when executed by the processor, configure the processor to:
  generate an error message that indicates that the I/O request cannot be executed against the at least one data block.

12. The storage medium controller of claim 9, further comprising logic instructions which, when executed by the processor, configure the processor to further comprising logic instructions which, when executed by the processor, configure the processor to:
  return a random or meaningless sequence of values in response to the input/output request.

13. The storage medium controller of claim 9, wherein altering the response to the input/output request when a scrub state data table indicates that the at least one data block designated in the input/output request is subject to an open scrub command comprises:
  returning a pre-existing cached sequence of values in response to the input/output request, the pre-existing cached sequence may be fixed, or may be specified by the entry in the scrub state data table associated with the at least one data block.

14. The storage medium controller of claim 9, further comprising logic instructions which, when executed by the processor, configure the processor to:
  place the input/output request in a queue for processing at a later time.

15. The storage medium controller of claim 9, further comprising logic instructions which, when executed by the processor, configure the processor to:
  execute the input/output request when a scrub state data table indicates that the at least one data block designated in the input/output request is not subject to an open scrub command.

16. The storage medium controller of claim 9, further comprising logic instructions which, when executed by the processor, configure the processor to:
  execute a scrubbing operation on the storage medium; and
  update the scrub state data table to reflect a successful execution of the scrubbing operation.

17. The storage medium controller of claim 9, wherein the storage medium controller is a disk controller.

18. The storage medium controller of claim 9, wherein the storage medium controller is a storage controller.

19. A storage device, comprising:
  a persistent storage medium comprising a plurality of addressable memory locations and a scrub state data table;
  a storage controller including a memory module communicatively connected to a processor and comprising logic instructions which, when executed by the processor, configure the processor to refuse input/output requests directed to one or more addressable memory locations indicated in the scrub state data table as subject to an outstanding scrub operation.

20. The storage device of claim 19, wherein the persistent storage medium comprises a hard disk, a floppy disk, an optical disk, or a magnetic tape.

21. The storage device of claim 19, wherein the scrub state data table comprises an entry for each addressable memory location on the persistent storage medium.

22. The storage device of claim 19, wherein the memory module further comprises logic instructions which, when executed by the processor, configure the processor to generate an error message that indicates that the I/O request cannot be executed against the at least one data block.

* * * * *

UNITED STATES PATENT AND TRADEMARK OFFICE
CERTIFICATE OF CORRECTION

| | |
|---|---|
| PATENT NO. | : 7,325,078 B2 |
| APPLICATION NO. | : 11/244763 |
| DATED | : January 29, 2008 |
| INVENTOR(S) | : Philip M. Walker et al. |

It is certified that error appears in the above-identified patent and that said Letters Patent is hereby corrected as shown below:

In column 12, line 43, in Claim 2, delete "bock" and insert -- block --, therefor.

In column 13, line 40, in Claim 10, delete "bock" and insert -- block --, therefor.

Signed and Sealed this

Twenty-second Day of July, 2008

JON W. DUDAS
*Director of the United States Patent and Trademark Office*